United States Patent
Ogihara

(10) Patent No.: US 12,485,616 B2
(45) Date of Patent: Dec. 2, 2025

(54) THREE-DIMENSIONAL SHAPING DEVICE AND THREE-DIMENSIONAL SHAPED OBJECT MANUFACTURING METHOD

(71) Applicant: SEIKO EPSON CORPORATION, Tokyo (JP)

(72) Inventor: Masaaki Ogihara, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 219 days.

(21) Appl. No.: 18/333,817

(22) Filed: Jun. 13, 2023

(65) Prior Publication Data

US 2023/0405934 A1  Dec. 21, 2023

(30) Foreign Application Priority Data

Jun. 14, 2022  (JP) ................................ 2022-095489

(51) Int. Cl.
    *B29C 64/343* (2017.01)
    *B29C 64/209* (2017.01)
    (Continued)

(52) U.S. Cl.
    CPC .......... *B29C 64/343* (2017.08); *B29C 64/209* (2017.08); *B29C 64/321* (2017.08);
    (Continued)

(58) Field of Classification Search
    CPC ... B29C 64/106; B29C 64/209; B29C 64/343; B29C 64/393; B33Y 30/00; B33Y 50/02
    See application file for complete search history.

(56) References Cited

U.S. PATENT DOCUMENTS

| 6,054,077 A * | 4/2000 | Comb ..................... B29C 48/92 425/375 |
| 2004/0178376 A1 * | 9/2004 | Tseng ...................... F16K 1/221 251/129.04 |

(Continued)

FOREIGN PATENT DOCUMENTS

JP   2021-062566 A   4/2021

*Primary Examiner* — Jerzi H Moreno Hernandez
(74) *Attorney, Agent, or Firm* — Harness, Dickey & Pierce, P.L.C.

(57) ABSTRACT

A three-dimensional shaping device includes: a nozzle configured to discharge a shaping material from a nozzle opening toward a stage; a position changing unit configured to change a relative position between the nozzle and the stage; a discharge amount adjusting unit configured to adjust a discharge amount by changing an opening area of the flow path; a pressure adjusting unit including a branch flow path coupled to the flow path between the discharge amount adjusting unit and the nozzle opening, and a plunger configured to move in the branch flow path; and a control unit configured to control the position changing unit, the discharge amount adjusting unit, and the pressure adjusting unit. The control unit is configured to execute an operation of absorbing the shaping material into the branch flow path by moving the plunger and an operation of delivering the absorbed shaping material to the branch flow path when shaping one partial shaped object having a continuous linear shape, and control movement of the plunger such that positions of the plunger at a start and an end of a shaping section of the partial shaped object match with each other.

7 Claims, 6 Drawing Sheets

(51) Int. Cl.
*B29C 64/321* (2017.01)
*B29C 64/393* (2017.01)
*B33Y 50/02* (2015.01)
*B33Y 30/00* (2015.01)

(52) U.S. Cl.
CPC ............. *B29C 64/393* (2017.08); *B33Y 30/00* (2014.12); *B33Y 50/02* (2014.12)

(56) References Cited

U.S. PATENT DOCUMENTS

2020/0164589 A1\* 5/2020 Yuwaki ................. B29C 64/393
2021/0114306 A1\* 4/2021 Yamazaki ............. B29C 64/393

\* cited by examiner

THREE-DIMENSIONAL SHAPING DEVICE AND THREE-DIMENSIONAL SHAPED OBJECT MANUFACTURING METHOD The present application is based on, and claims priority from JP Application Serial Number 2022-095489, filed Jun. 14, 2022, the disclosure of which is hereby incorporated by reference herein in its entirety.

BACKGROUND

1. Technical Field

The present disclosure relates to a three-dimensional shaping device and a three-dimensional shaped object manufacturing method.

2. Related Art

As a three-dimensional shaping device, JP-A-2021-62566 discloses a device including an absorption mechanism including a butterfly valve provided in a flow path, a cylinder coupled to the flow path, and a plunger disposed inside the cylinder. In the device of JP-A-2021-62566, a material in the flow path is absorbed into the cylinder by pulling the plunger away from the flow path, and the material in the cylinder can be pushed out to the flow path by pushing the plunger toward the flow path.

In the device including the plunger as in JP-A-2021-62566, since a position of the plunger in a branch flow path is changed by an operation of the plunger, a desired plunger operation may not be performed immediately due to shortage of space for moving the plunger. For example, when the plunger is further pulled after the plunger is continuously pulled, it is necessary to secure a space for further pulling the plunger in the cylinder by temporarily stopping the shaping, pushing the plunger to discharge the material to the outside, and the like.

SUMMARY

According to a first aspect of the present disclosure, a three-dimensional shaping device is provided. The three-dimensional shaping device includes: a nozzle having a nozzle opening and configured to discharge a shaping material from the nozzle opening toward a stage; a position changing unit configured to change a relative position between the nozzle and the stage; a discharge amount adjusting unit provided in a flow path which is in communication with the nozzle opening and through which the shaping material flows, and configured to adjust a discharge amount of the shaping material from the nozzle opening by changing an opening area of the flow path; a pressure adjusting unit including a branch flow path coupled to the flow path between the discharge amount adjusting unit and the nozzle opening, and a plunger configured to move in the branch flow path; and a control unit configured to control the position changing unit, the discharge amount adjusting unit, and the pressure adjusting unit. The control unit is configured to execute an absorption operation of absorbing the shaping material in the flow path into the branch flow path and a delivery operation of delivering the shaping material absorbed into the branch flow path to the flow path, by moving the plunger when shaping one partial shaped object having a continuous linear shape, and control movement of the plunger such that positions of the plunger in the branch flow path at a start and an end of a shaping section for shaping the partial shaped object match with each other.

According to a second aspect of the present disclosure, a three-dimensional shaped object manufacturing method to be executed in a three-dimensional shaping device is provided, the three-dimensional shaping device includes a nozzle having a nozzle opening and configured to discharge a shaping material from the nozzle opening toward a stage; a position changing unit configured to change a relative position between the nozzle and the stage; a discharge amount adjusting unit provided in a flow path which is in communication with the nozzle opening and through which the shaping material flows, and configured to adjust a discharge amount of the shaping material from the nozzle opening by changing an opening area of the flow path; a pressure adjusting unit including a branch flow path coupled to the flow path between the discharge amount adjusting unit and the nozzle opening, and a plunger configured to move in the branch flow path. The manufacturing method includes: absorbing the shaping material in the flow path into the branch flow path, and delivering the shaping material absorbed into the branch flow path to the flow path, by moving the plunger when shaping one partial shaped object having a continuous linear shape, and the plunger is moved such that positions of the plunger in the branch flow path at a start and an end of a shaping section for shaping the partial shaped object match with each other.

DESCRIPTION OF EXEMPLARY EMBODIMENTS

A. First Embodiment

Figure 1:
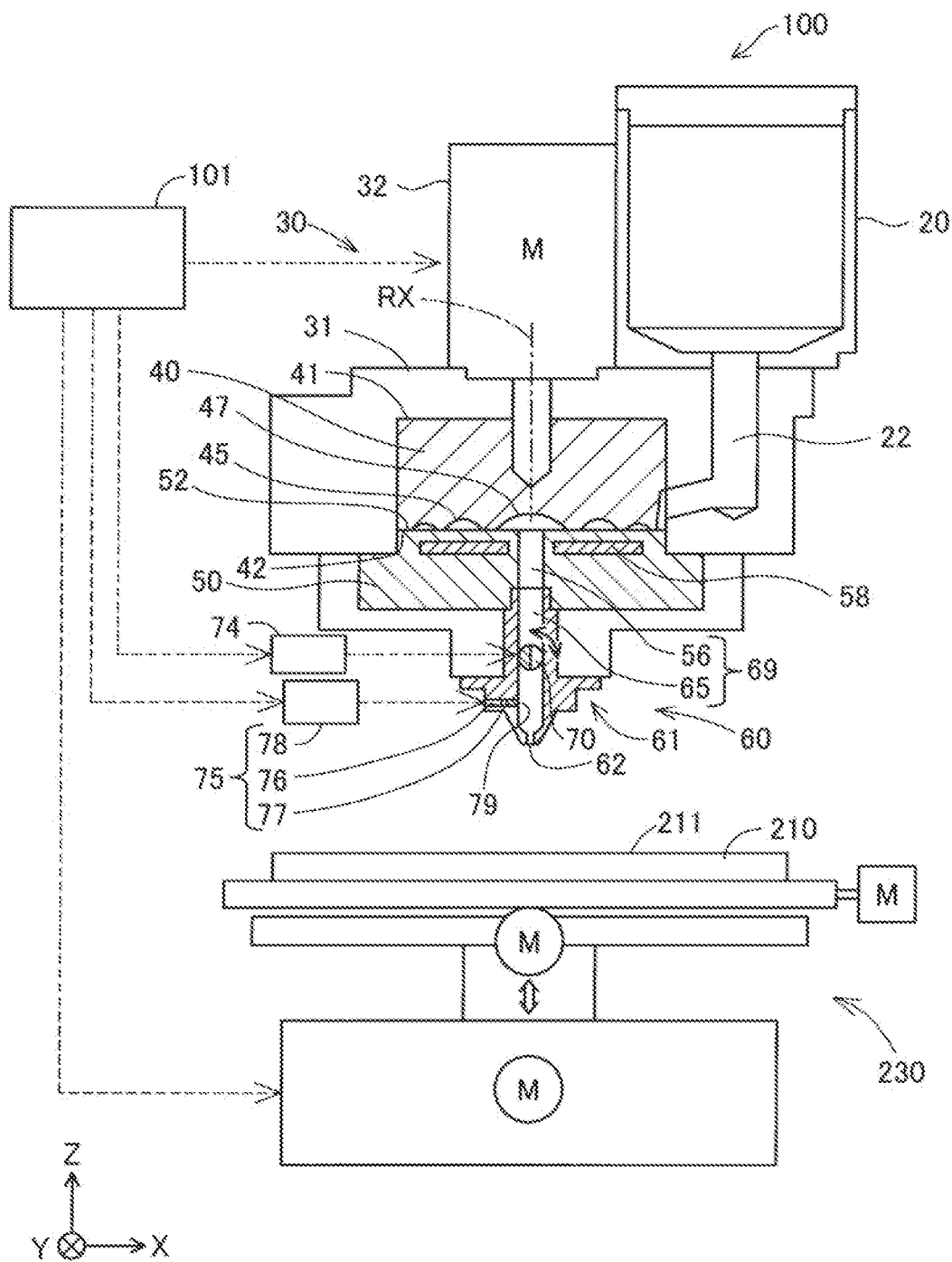
FIG. 1 is a schematic diagram showing a schematic configuration of a three-dimensional shaping device according to a first embodiment.

FIG. 1 is a schematic diagram showing a schematic configuration of a three-dimensional shaping device 100 according to a first embodiment. FIG. 1 shows arrows along X, Y, and Z directions which are orthogonal to one another. The X, Y, and Z directions are directions along an X axis, a Y axis, and a Z axis that are three spatial axes orthogonal to one another, and each direction include a direction on one side along the X axis, the Y axis, and the Z axis and a direction opposite thereto. The X axis and the Y axis are axes along a horizontal plane, and the Z axis is an axis along a vertical line. In other drawings, the arrows along the X, Y, and Z directions are also appropriately represented. The X, Y, and Z directions in FIG. 1 and X, Y, and Z directions in other drawings represent the same directions. Hereinafter, a +Z direction is referred to as "upper", and a −Z direction is referred to as "lower".

The three-dimensional shaping device 100 includes a control unit 101 that controls the three-dimensional shaping device 100, a discharge unit 200 that generates and discharges a shaping material, a shaping stage 210 as a base of a three-dimensional shaped object, and a position changing unit 230 that controls a discharge position of the shaping material.

Under control of the control unit 101, the discharge unit 200 discharges a paste-shaped shaping material, which is obtained by melting a material in a solid state, onto the stage 210. The discharge unit 200 includes a material supply unit 20 that is a supply source of a material before being converted into the shaping material, a plasticizing unit 30 that plasticizes at least a part of the material to generate the shaping material, a flow path 69 through which the generated shaping material flows, a nozzle 61 that communicates with the flow path 69 and discharges the shaping material, a discharge amount adjusting unit 70 provided in the flow path 69, and a pressure adjusting unit 75 provided in the flow path 69. The flow path 69 communicates with a nozzle opening 62 of the nozzle 61 described later.

The material supply unit 20 accommodates a material in a state of pellets, powder, or the like. In the embodiment, a resin formed in a pellet form is used as the material. The material supply unit 20 according to the embodiment is implemented by a hopper. A supply path 22 that couples the material supply unit 20 and the plasticizing unit 30 is provided below the material supply unit 20. The material supply unit 20 supplies the material to the plasticizing unit 30 via the supply path 22.

The plasticizing unit 30 includes a screw case 31, a driving motor 32, a screw 40, and a barrel 50. The plasticizing unit 30 plasticizes at least a part of the material supplied from the material supply unit 20, and generates the paste-shaped shaping material having fluidity. Then, the plasticizing unit 30 supplies the generated shaping material to the nozzle 61. "Plasticization" is a concept including melting, and refers to a change from a solid state to a state of exhibiting fluidity. Specifically, in a case of a material in which glass transition occurs, the plasticization refers to setting a temperature of the material to be equal to or higher than a glass transition point. In a case of a material in which no glass transition occurs, the plasticization refers to setting a temperature of the material to be equal to or higher than a melting point. The screw 40 according to the embodiment may be referred to as a flat screw or a scroll.

Figure 2:
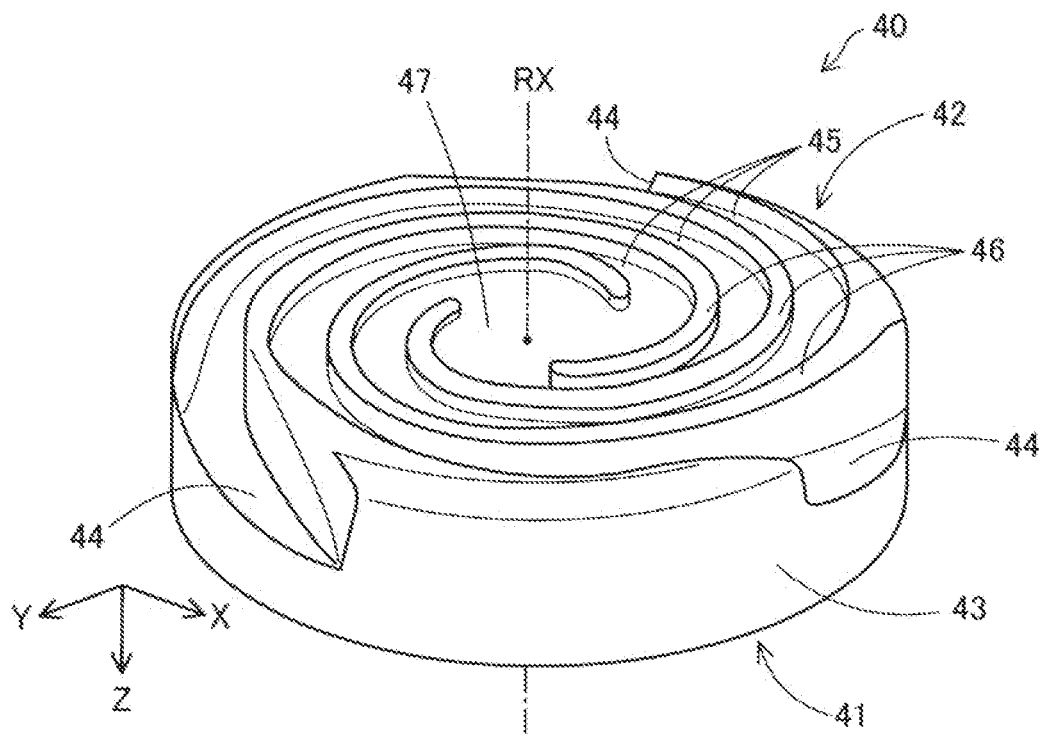
FIG. 2 is a perspective view showing a schematic configuration of a screw.
Figure 3:
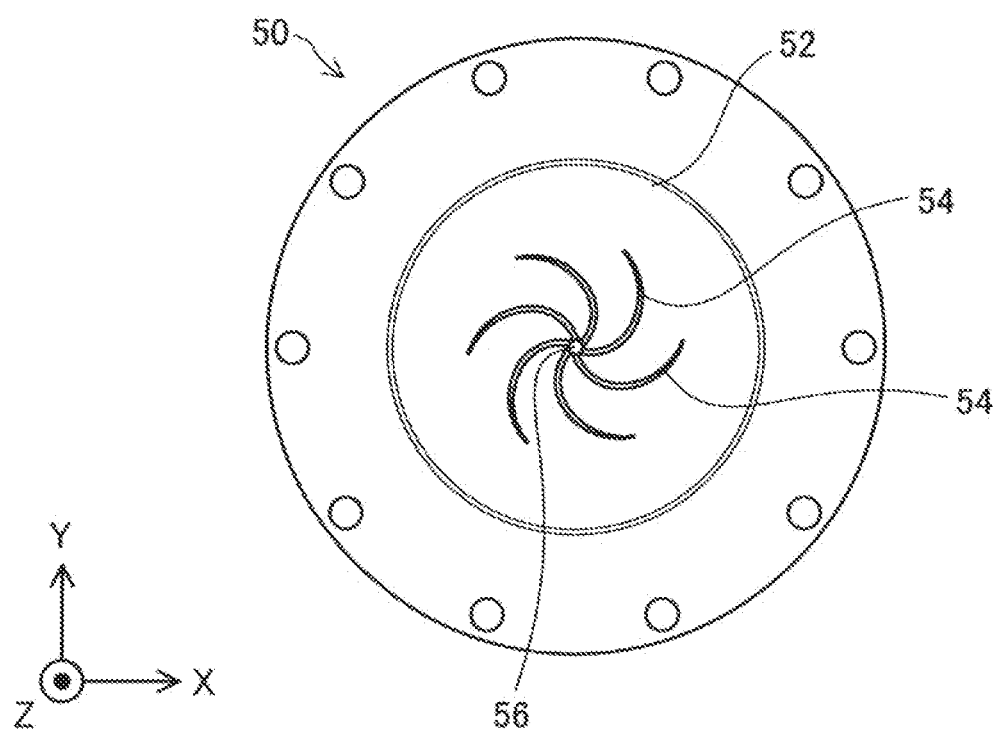
FIG. 3 is a schematic plan view showing a barrel.

FIG. 2 is a perspective view showing a schematic configuration of the screw 40. FIG. 3 is a schematic plan view showing the barrel 50. The screw 40 has a substantially cylindrical shape in which a length in an axial direction which is a direction along a center axis RX of the screw 40 is smaller than a length in a direction orthogonal to the axial direction. The screw 40 is disposed such that the center axis RX, which is a rotation center of the screw 40, is parallel to the Z direction.

As shown in FIG. 1, the screw 40 is accommodated in the screw case 31. An upper surface 41 side of the screw 40 is coupled to the driving motor 32, and the screw 40 rotates in the screw case 31 by a rotation driving force generated by the driving motor 32. The driving motor 32 performs driving under the control of the control unit 101. The screw 40 may be driven by the driving motor 32 via a speed reducer.

As shown in FIG. 2, spiral groove portions 45 are formed in a screw lower surface 42. The supply path 22 of the material supply unit 20 described above communicates with the groove portions 45 from a side surface 43 of the screw 40. The groove portions 45 are continuous to material introduction ports 44 formed in the side surface 43 of the screw 40. The material introduction port 44 is a portion for receiving the material supplied via the supply path 22 of the material supply unit 20. As shown in FIG. 2, in the embodiment, three groove portions 45 are formed in a manner of being separated from one another by ridge portions 46. The number of the groove portions 45 is not limited to three, and may be one or two or more. A shape of the groove portion 45 is not limited to a spiral shape, and may be a helical shape or an involute curve shape, or may be a shape extending in a manner of drawing an arc from a center portion 47 toward an outer periphery.

As shown in FIG. 1, the barrel 50 is disposed under the screw 40. A barrel upper surface 52 faces the screw lower surface 42, and spaces are formed between the groove portions 45 of the screw lower surface 42 and the barrel upper surface 52. The barrel 50 is provided with, on the center axis RX of the screw 40, a communication hole 56 communicating with the nozzle 61 to be described later. In the embodiment, the communication hole 56 forms a part of the flow path 69 described above. A heater 58 is built in the barrel 50 at a position facing the groove portions 45 of the screw 40. A temperature of the heater 58 is controlled by the control unit 101.

The material supplied into the groove portions 45 of the screw 40 flows along the groove portions 45 due to the rotation of the screw 40 while being melted in the groove portions 45, and is guided, as the shaping material, to the center portion 47 of the screw 40. The paste-shaped shaping material flowing into the center portion 47 and exhibiting fluidity is supplied to the nozzle 61 via the communication hole 56. In the shaping material, not all types of substances constituting the shaping material may be melted. The shaping material may be converted into the state having fluidity as a whole by melting at least a part of types of substances among all the types of substances constituting the shaping material.

As shown in FIG. 1, the nozzle 61 includes a nozzle flow path 65 and a tip end surface 63 provided with the nozzle opening 62. The nozzle flow path 65 is a flow path of the shaping material, which is formed in the nozzle 61, and forms a part of the flow path 69 described above. The tip end surface 63 is a surface constituting a tip end portion of the nozzle 61 that protrudes in the −Z direction toward a shaping surface 211. The nozzle opening 62 is a portion which is provided at an end portion of the nozzle flow path 65 on a side communicating with the atmosphere, that is, an end portion on a tip end surface 63 side, and in which a flow path cross section of the nozzle flow path 65 is reduced. The shaping material generated by the plasticizing unit 30 is discharged from the nozzle opening 62 via the flow path 69. A heater that prevents a decrease in temperature of the shaping material discharged onto the stage 210 may be disposed around the nozzle 61.

The discharge amount adjusting unit 70 adjusts a discharge amount by changing an opening area of the flow path 69. The discharge amount adjusting unit 70 according to the embodiment is implemented by a butterfly valve, and is provided in the nozzle flow path 65. The discharge amount adjusting unit 70 rotates in the nozzle flow path to change an opening degree of the nozzle flow path 65. The discharge amount adjusting unit 70 is driven by a first driving unit 74 under the control of the control unit 101. The first driving unit 74 is implemented by, for example, a stepping motor.

The control unit 101 adjusts an amount of the shaping material flowing through the flow path 69 by controlling a rotation angle of the butterfly valve by using the first driving unit 74. Accordingly, a flow rate of the shaping material flowing from the plasticizing unit to the nozzle 61 can be adjusted, and the discharge amount can be adjusted. The discharge amount adjusting unit 70 adjusts the flow rate of the shaping material and controls ON/OFF of an outflow of the shaping material.

The pressure adjusting unit 75 includes a branch flow path 76, a plunger 77, and a second driving unit 78. The branch flow path 76 is coupled to the flow path 69 between the discharge amount adjusting unit 70 and the nozzle opening 62, that is, a portion of the flow path 69 between the discharge amount adjusting unit 70 and the nozzle opening 62. In the embodiment, the branch flow path 76 is formed by a cylinder coupled to the nozzle flow path 65, and extends in the −X direction from a portion coupled to the nozzle flow path 65. The plunger 77 moves in the branch flow path 76. More specifically, the plunger 77 is driven by the second driving unit 78 under the control of the control unit 101. The second driving unit 78 is implemented by, for example, a stepping motor, or a rack-and-pinion mechanism that converts a rotational force of a stepping motor into a translational motion of the plunger 77.

When a partial shaped object to be described later is shaped, the control unit 101 controls the pressure adjusting unit 75 to move the plunger 77 in the branch flow path 76, thereby executing an absorption operation and a delivery operation. The absorption operation refers to an operation of absorbing the shaping material in the flow path 69 into the branch flow path 76. The delivery operation refers to an operation of delivering the shaping material absorbed into the branch flow path 76 to the flow path 69. In the embodiment, the control unit 101 retracts the plunger 77 in a direction away from the nozzle flow path 65 in the absorption operation, and advances the plunger 77 in a direction approaching the nozzle flow path 65 in the delivery operation.

When the absorption operation is performed, since the shaping material in the nozzle flow path 65 is absorbed toward the pressure adjusting unit 75, a pressure in the nozzle flow path 65 decreases. When the delivery operation is performed, since the shaping material is discharged from the pressure adjusting unit 75 toward the nozzle flow path 65, the pressure in the nozzle flow path 65 increases. In this manner, the pressure adjusting unit 75 adjusts a pressure in the flow path 69.

By executing the absorption operation to reduce the pressure in the flow path 69, it is possible to prevent a tailing phenomenon in which the shaping material drips from the nozzle opening 62 in a form of a thread. In this case, the control unit 101 can more effectively prevent the tailing phenomenon by executing the absorption operation after the opening degree of the nozzle flow path 65 is set to zero by the discharge amount adjusting unit 70. In addition, it is also possible to improve responsiveness in delivering the shaping material from the nozzle opening 62 by executing the delivery operation to increase the pressure in the flow path 69. In this case, the control unit 101 executes the delivery operation before the opening degree of the nozzle flow path 65 is set to be larger than zero by the discharge amount adjusting unit 70, and thus it is possible to further improve the responsiveness in delivering the shaping material.

The stage 210 is disposed at a position facing the nozzle 61. The three-dimensional shaping device 100 shapes the three-dimensional shaped object by discharging the shaping material from the nozzle opening 62 toward the shaping surface 211 of the stage 210 and laminating layers of the shaping material. Among the shaping surface 211 and a region above the shaping surface 211, a region where the three-dimensional shaped object is shaped is also referred to as a shaping region.

The position changing unit 230 changes a relative position between the nozzle 61 and the stage 210. In the embodiment, the position changing unit 230 moves the stage 210 with respect to the nozzle 61. The change in the relative position of the nozzle 61 with respect to the stage 210 may be simply referred to as movement or scanning of the nozzle 61. In the embodiment, for example, moving the stage 210 in the +X direction can also be rephrased as moving the nozzle 61 in the −X direction. A relative movement speed of the nozzle 61 with respect to the stage 210 is also referred to as a relative movement speed of the nozzle 61. The relative movement speed of the nozzle 61 is also simply referred to as a movement speed or a scanning speed of the nozzle 61. The position changing unit 230 according to the embodiment is implemented by a three-axis positioner that moves the stage 210 in three axial directions including the X, Y, and Z directions by driving forces of three motors. Each of the motors is driven under the control of the control unit 101. The position changing unit 230 may not move the stage 210, but move the nozzle 61 without moving the stage 210. In addition, the position changing unit 230 may move both the stage 210 and the nozzle 61.

The control unit 101 is implemented by a computer including one or more processors, a main storage device, and an input and output interface that inputs and outputs a signal to and from an outside. In the embodiment, the control unit 101 exhibits various functions, such as a function of executing a three-dimensional shaping process for shaping a three-dimensional shaped object, by the processor executing a program or a command read from the main storage device. The control unit 101 may be implemented by a combination of a plurality of circuits instead of the computer.

In the three-dimensional shaping process, the control unit 101 controls the discharge unit 200 and the position changing unit 230 according to shaping data to shape a shaped object in the shaping region on the shaping surface 211. The shaping data includes shaping path data representing a movement path in which the nozzle 61 moves relative to the stage 210, and discharge amount data representing a discharge amount associated with the shaping path data. The discharge amount refers to an amount of the shaping material discharged from the nozzle opening 62.

Figure 4:
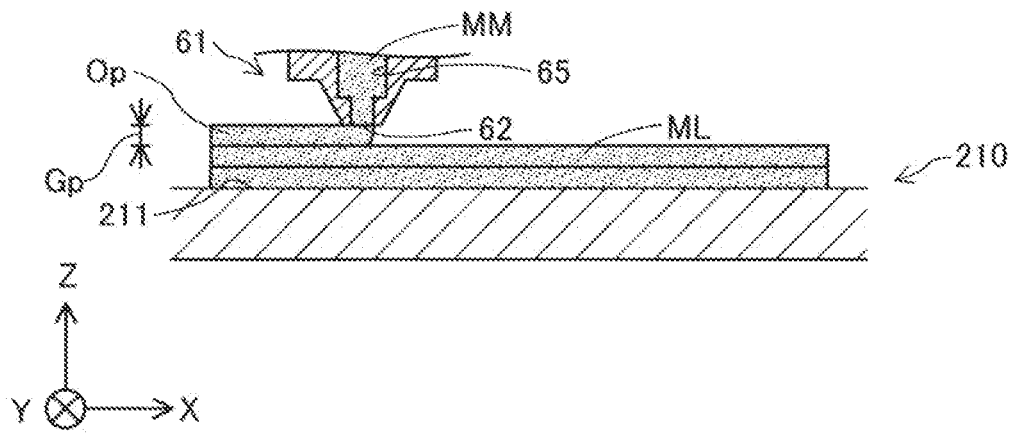
FIG. 4 is a schematic diagram schematically showing a state of shaping a three-dimensional shaped object.

FIG. 4 is a schematic diagram schematically showing a state in which the three-dimensional shaping device 100 shapes the three-dimensional shaped object. In the three-dimensional shaping device 100, as described above, in the plasticizing unit 30, the solid material supplied to the groove portions 45 of the rotating screw 40 is melted and a shaping material MM is generated. The control unit 101 discharges the shaping material MM from the nozzle 61 while changing the position of the nozzle 61 with respect to the stage 210 in a direction along the shaping surface 211 of the stage 210, with a distance maintained constant between the shaping surface 211 of the stage 210 and the nozzle 61. The shaping material MM discharged from the nozzle 61 is continuously deposited in a moving direction of the nozzle 61. By performing scanning with the nozzle 61 in this manner, a shaping portion linearly extending along a scanning path of the nozzle 61 is shaped. As described above, one continuous linear shaping portion of the three-dimensional shaped object is also referred to as a partial shaped object Op.

The control unit 101 forms layers ML by repeating the scanning with the nozzle 61 described above. The control unit 101 moves the position of the nozzle 61 with respect to the stage 210 in the Z direction after one layer ML is formed. Then, the layer ML is further laminated on the layers ML formed so far to shape the three-dimensional shaped object. During laminating of the layers of the shaping material, the control unit 101 discharges the shaping material from the nozzle 61 while maintaining a distance between the nozzle 61 and a discharge target. The discharge target is the shaping surface 211 when the shaping material is to be discharged onto the shaping surface 211, and is an upper surface of the discharged shaping material when the shaping material is to be discharged onto the discharged shaping material. The distance between the nozzle 61 and the discharge target may be referred to as a gap Gp.

A width of the partial shaped object Op described above is also referred to as a line width, and a height of the partial shaped object Op is also referred to as a lamination pitch. The line width and the lamination pitch are determined by a size of the gap Gp described above and the amount of the shaping material discharged from the nozzle 61 per unit movement amount. For example, when the gap Gp is small, the shaping material discharged from the nozzle 61 is further pressed against the discharge target by the nozzle 61 as compared with a case where the gap Gp is large, and thus the lamination pitch is small and the line width is large. The amount of the shaping material discharged from the nozzle 61 per unit movement amount is determined by the movement speed of the nozzle 61 and the amount of the shaping material discharged from the nozzle 61 per unit time. The amount of the shaping material discharged from the nozzle 61 per unit time is determined by, for example, a size of the nozzle opening 62, the flow rate of the shaping material flowing in the flow path 69, and the pressure in the flow path 69.

Figure 5:
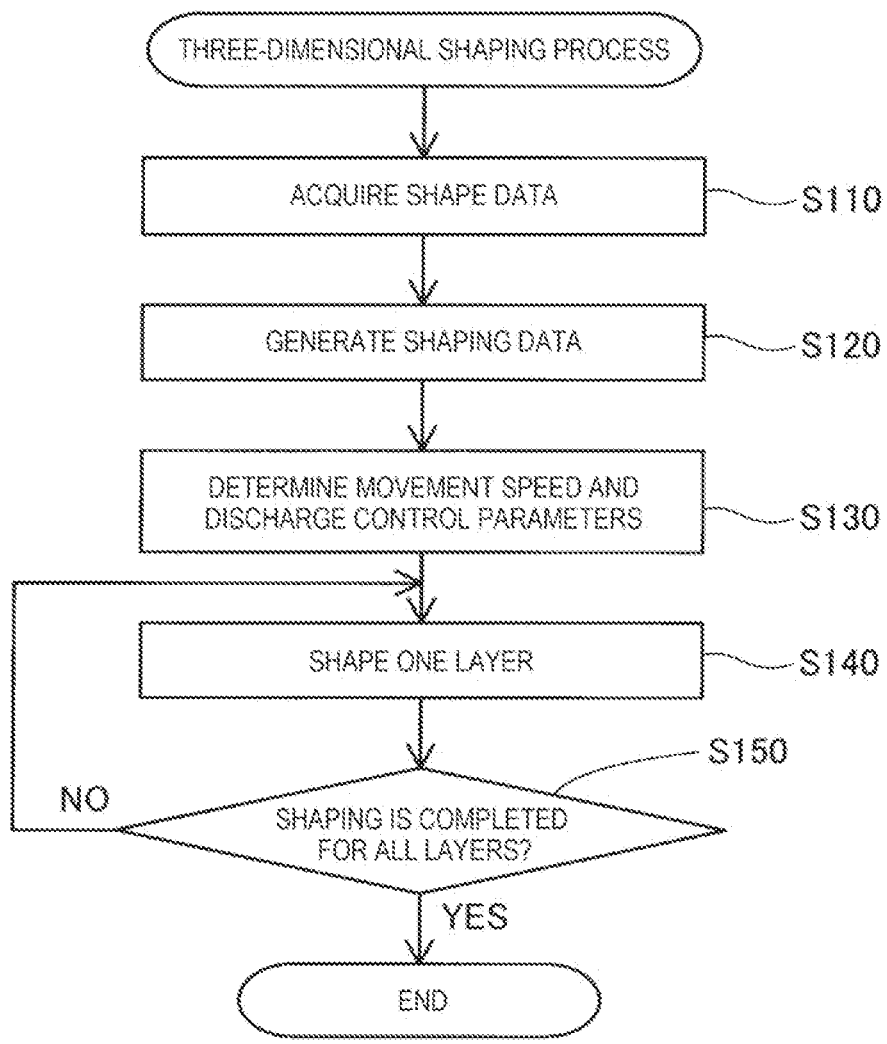
FIG. 5 is a flowchart of a three-dimensional shaping process.

FIG. 5 is a flowchart of a three-dimensional shaping process for implementing a three-dimensional shaped object manufacturing method according to the embodiment. First, in step S110, the control unit 101 acquires shape data representing a shape of a three-dimensional shaped object from an external computer, a recording medium, or the like. The control unit 101 acquires the shape data such as three-dimensional CAD data from the outside through a network or a recording medium, for example.

Next, in step S120, based on the three-dimensional data acquired in step S110, the control unit 101 generates shaping data for shaping the three-dimensional shaped object represented by the three-dimensional data. More specifically, in step S120, the control unit 101 generates the shaping path data and the discharge amount data described above. In another embodiment, for example, the control unit 101 may acquire the shaping data from the outside through a network or a recording medium instead of generating the shaping data by executing steps S110 and S120.

In step S130, the control unit 101 determines movement speed data and discharge control parameters. The movement speed data represents the movement speed of the nozzle 61 in each movement path included in the shaping path data. The discharge control parameter represents a parameter for controlling the discharge amount adjusting unit 70 and the pressure adjusting unit 75 in each movement path. Details of the discharge control parameter will be described later. The movement speed data and the discharge control parameters determined in step S130 may be included in the shaping data or may be generated as data different from the shaping data.

Next, in step S140, the control unit 101 controls the discharge unit 200 and the position changing unit 230 based on the shaping data generated in step S120 and the movement speed data and the discharge control parameters generated in step S130 to shape one layer of the three-dimensional shaped object. More specifically, in step S140, the control unit 101 shapes one or more partial shaped objects constituting one layer of the three-dimensional shaped object in the shaping region on the shaping surface 211. In step S150, the control unit 101 determines whether shaping of all layers of the three-dimensional shaped object is completed. When the control unit 101 determines that the shaping of all layers of the three-dimensional shaped object is not completed, the process returns to step S140, and shaping of a next layer is executed. When the control unit 101 determines that the shaping of all layers is completed, the control unit 101 ends the three-dimensional shaping process.

Figure 6:
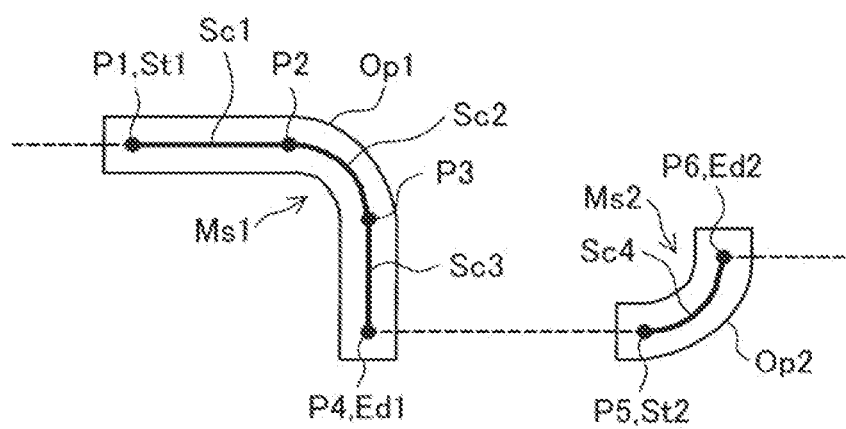
FIG. 6 is a schematic diagram showing an example of a partial shaped object.

FIG. 6 is a schematic diagram showing an example of the partial shaped object according to the embodiment. FIG. 6 schematically shows a first partial shaped object Op1 and a second partial shaped object Op2 as examples of a partial shaped object forming a certain layer of the three-dimensional shaped object. FIG. 6 shows, as a shaping section for shaping the partial shaped object, a first shaping section Ms1 which is a shaping section for shaping the first partial shaped object Op1 and a second shaping section Ms2 which is a shaping section for shaping the second partial shaped object Op2. The first shaping section Ms1 is represented by a movement path for shaping the first partial shaped object Op1 among the movement paths included in the shaping path data. The second shaping section Ms2 is represented by a movement path for shaping the second partial shaped object Op2 among the movement paths included in the shaping path data. In FIG. 6, among the movement paths of the nozzle 61, a movement path in which the nozzle 61 moves while discharging the shaping material is indicated by a solid line, and a movement path in which the nozzle 61 moves without discharging the shaping material is indicated by a dashed line.

Figure 7:
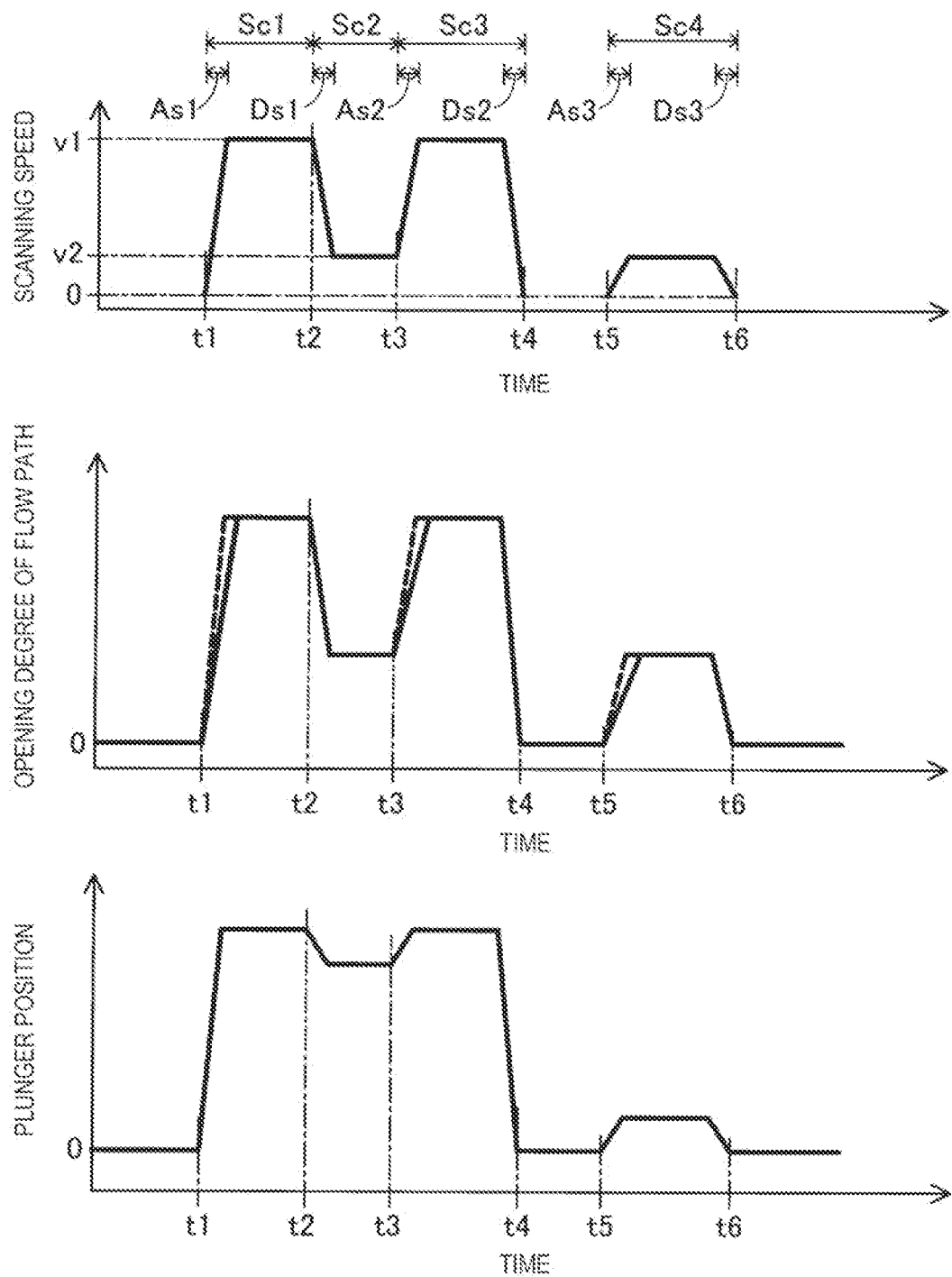
FIG. 7 is a diagram showing changes in a scanning speed, an opening degree of a flow path, and a position of a plunger.

FIG. 7 is a diagram showing changes in the scanning speed of the nozzle 61, the opening degree of the flow path 69, and a position of the plunger 77 when shaping the partial shaped object. FIG. 7 shows the changes in the scanning speed, the opening degree of the flow path 69, and the position of the plunger 77 with respect to a time when the first partial shaped object Op1 and the second partial shaped object Op2 shown in FIG. 6 are shaped. More specifically, in an upper part of FIG. 7, a schematic graph in which a horizontal axis represents the time and a vertical axis represents the scanning speed is shown. In the upper part of FIG. 7, a transition of the scanning speed in a section between the shaping sections, that is, a section in which the nozzle 61 moves without discharging the shaping material is omitted. Similarly, a graph in which the horizontal axis represents the time and the vertical axis represents the opening degree of the flow path 69 is shown in the middle of FIG. 7. Similarly, a graph in which the horizontal axis represents the time and the vertical axis represents a plunger position is shown in a lower part of FIG. 7. The plunger position shown in the lower part of FIG. 7 represents a position coordinate of an end surface 79 of the plunger 77 on the +X direction side in the X direction shown in FIG. 1. In the embodiment, when the plunger position is zero, the end surface 79 is positioned at a middle position of a movable range of the end surface 79. That is, when the end surface 79 is positioned on a flow path 69 side with respect to the middle position, the plunger position shown in FIG. 7 takes a positive value. When the end surface 79 is positioned on an opposite side of the middle position from the flow path 69, the plunger position shown in FIG. 7 takes a negative value. Accordingly, the greater the value of the plunger position shown in FIG. 7, the closer the plunger 77 is to the flow path 69.

The nozzle opening 62 is positioned at positions P1 to P6 shown in FIG. 6 at times t1 to t6 shown in FIG. 7, respectively. The position P1 and the position P4 correspond to a start St1 and an end Ed1 of the first shaping section Ms1, respectively. In addition, the position P5 and the position P6 correspond to a start St2 and an end Ed2 of the second shaping section Ms2, respectively.

In the embodiment, the first shaping section Ms1 shown in FIGS. 6 and 7 has three specified sections. The specified section refers to a section in the shaping section in which relative movement of the nozzle 61 with respect to the stage 210 at a constant movement speed is instructed. More specifically, the first shaping section Ms1 has a first specified section Sc1, a second specified section Sc2, and a third specified section Sc3 as the specified sections. The first specified section Sc1 to the third specified section Sc3 correspond to a section from the time t1 to the time t2, a section from the time t2 to the time t3, and a section from the time t3 to the time t4, respectively. In the first specified section Sc1 and the third specified section Sc3, the scanning with the nozzle 61 at a first scanning speed v1 is instructed. In the second specified section Sc2, the scanning with the nozzle 61 at a second scanning speed v2 is instructed. The first scanning speed v1 and the second scanning speed v2 represent a magnitude of a speed of the relative movement of the nozzle 61 with respect to the stage 210. The second scanning speed v2 is slower than the first scanning speed v1.

In the embodiment, the first shaping section Ms1 has two acceleration sections and two deceleration sections. The acceleration section refers to a section in the shaping section in which the scanning speed of the nozzle 61 is accelerated. The deceleration section refers to a section in the shaping section in which the scanning speed of the nozzle 61 is decelerated. More specifically, the first shaping section Ms1 has a first acceleration section As1 and a second acceleration section As2 as the acceleration sections. In the first acceleration section As1, the scanning speed of the nozzle 61 is accelerated from zero to the first scanning speed v1. In the embodiment, the first acceleration section As1 is included in the first specified section Sc1. A start of the first acceleration section As1 corresponds to a start of the first specified section Sc1 and the start St' of the first shaping section Ms1. In the second acceleration section As2, the scanning speed is accelerated from the second scanning speed v2 to the first scanning speed v1. The second acceleration section As2 is included in the third specified section Sc3.

The first shaping section Ms1 has a first deceleration section Ds1 and a second deceleration section Ds2 as the deceleration sections. In the first deceleration section Ds1, the scanning speed of the nozzle 61 is decelerated from the first scanning speed v1 to the second scanning speed v2. In the embodiment, the first deceleration section Ds1 is included in the second specified section Sc2. In the second deceleration section Ds2, the scanning speed of the nozzle 61 is decelerated from the first scanning speed v1 to zero. In the embodiment, the second deceleration section Ds2 is included in the third specified section Sc3. An end of the second deceleration section Ds2 corresponds to an end of the third specified section Sc3 and the end Ed1 of the first shaping section Ms1.

Similarly, the second shaping section Ms2 has a fourth specified section Sc4 as the specified section. The fourth specified section Sc4 corresponds to a section from the time t5 to the time t6. In the fourth specified section Sc4, the scanning with the nozzle 61 at the second scanning speed v2 is instructed. The second shaping section Ms2 has a third acceleration section As3 as the acceleration section and a third deceleration section Ds3 as the deceleration section. The third acceleration section As3 and the third deceleration section Ds3 are included in the fourth specified section Sc4. In the third acceleration section As3, the scanning speed of the nozzle 61 is accelerated from zero to the second scanning speed v2. In the embodiment, a start of the third acceleration section As3 corresponds to a start of the fourth specified section Sc4 and a start of the second shaping section Ms2. In the third deceleration section Ds3, the scanning speed is decelerated from the second scanning speed v2 to zero. An end of the third deceleration section Ds3 corresponds to the end of the fourth specified section Sc4 and the end Ed2 of the second shaping section Ms2.

In the embodiment, the control unit 101 executes at least one of a first operation, a second operation, and a third operation in the specified section. The first operation refers to an operation of discharging the shaping material from the nozzle opening 62, without controlling the pressure adjusting unit 75, in a state where the flow path 69 is opened by the discharge amount adjusting unit 70. The second operation refers to an operation of discharging the shaping material from the nozzle opening 62 by controlling the pressure adjusting unit 75 to execute the delivery operation in a state where the flow path 69 is opened by the discharge amount adjusting unit 70. The third operation refers to an operation of discharging the shaping material from the nozzle opening 62 by controlling the pressure adjusting unit 75 to execute the delivery operation in a state where the flow path 69 is closed by the discharge amount adjusting unit 70.

As shown in FIG. 7, in the embodiment, the control unit 101 executes the above-described second operation corresponding to the acceleration section and executes a fourth operation corresponding to the deceleration section. The fourth operation refers to an operation of executing the absorption operation in a state where the flow path 69 is opened by the discharge amount adjusting unit 70. Further, the control unit 101 executes the first operation in a section of the specified sections that is other than the section in which the second operation and the fourth operation are executed. Therefore, in the embodiment, in the first specified section Sc1, the first operation is executed after the second operation is executed in the first acceleration section As1. In the second specified section Sc2, the first operation is executed after the fourth operation is executed in the first deceleration section Ds1. In the third specified section Sc3, the second operation is executed in the second acceleration section As2, and then the first operation is executed. Thereafter, the fourth operation is executed in the second deceleration section Ds2. In the fourth specified section Sc4, the second operation is executed in the third acceleration section As3, and then the first operation is executed. Thereafter, the fourth operation is executed in the third deceleration section Ds3. In this manner, in the embodiment, the second operation is executed before the first operation.

In the embodiment, as shown in FIG. 7, in the first operation, the control unit 101 discharges the shaping material from the nozzle opening 62 in a state where the flow path 69 is opened and the opening degree of the flow path 69 is constant without changing the position of the plunger 77. In the second operation, that is, in the acceleration section, the control unit 101 controls the discharge amount adjusting unit 70 to gradually increase the opening degree of the flow path 69, and also controls the pressure adjusting unit 75 to gradually advance the plunger 77 so as to approach the flow path 69. In the embodiment, the control unit 101 controls the discharge amount adjusting unit 70 to make the opening area in the second operation smaller than the opening area in the first operation. The opening area in the first operation or the second operation refers to a time average value of the opening area from a start to an end of the operation. In addition, in the fourth operation, that is, in the deceleration section, the control unit 101 controls the discharge amount adjusting unit 70 to gradually decrease the opening degree of the flow path 69, and controls the pressure adjusting unit 75 to gradually retract the plunger 77 so as to be away from the flow path 69.

In step S130, the control unit 101 controls the movement of the plunger 77 such that the positions of the plunger 77 in the branch flow path 76 at the start and the end of the shaping section match with each other. In the embodiment, the control unit 101 implements such control of the position of the plunger 77 at the start and the end by controlling a sum of displacements of the plunger 77 which occur due to the movement of the plunger 77 corresponding to the acceleration sections and a sum of displacements of the plunger 77 which occur due to the movement of the plunger 77 corresponding to the deceleration sections in a certain shaping section. More specifically, the control unit 101 controls the movement of the plunger 77 such that the sum of displacements of the plunger 77 which occur due to the movement of the plunger 77 corresponding to the acceleration sections and the sum of displacements of the plunger 77 which occur due to the movement of the plunger 77 corresponding to the deceleration sections in a certain shaping section offset each other. The displacement of the plunger 77 is expressed as a vector quantity, and takes a positive value when the plunger 77 moves to approach the flow path 69, and takes a negative value when the plunger 77 moves away from the flow path 69. In the embodiment, the control unit 101 executes only the delivery operation in the delivery operation and the absorption operation corresponding to each acceleration section, and executes only the absorption operation in the delivery operation and the absorption operation corresponding to each deceleration section. Accordingly, in the embodiment, offsetting the sum of displacements of the plunger 77 corresponding to the acceleration sections and the sum of displacements of the plunger 77 corresponding to the deceleration sections is synonymous with matching a sum of movement amounts of the plunger 77 corresponding to the acceleration sections and a sum of movement amounts of the plunger 77 corresponding to the deceleration sections.

When the control unit 101 controls the movement of the plunger 77 such that the positions of the plunger 77 at the start and the end of the shaping section match with each other, it is not necessary to completely match the positions of the plunger 77 at the start and the end of the shaping section. More specifically, when a difference between the positions of the plunger 77 at the start and the end of a certain shaping section is 20% or less of a movable distance of the plunger 77 in the branch flow path 76, it can be interpreted that the positions of the plunger 77 at the start and the end of the shaping section match with each other. The difference between the positions of the plunger 77 at the start and the end of the shaping section is more preferably 10% or less of the movable distance, and even more preferably 5% or less of the movable distance.

In the embodiment, in step S130, the control unit 101 controls the movement of the plunger 77 such that a movement amount of the plunger 77 corresponding to a first section matches a movement amount of the plunger 77 in a second section. The first section refers to a section in which the scanning speed is accelerated from a first speed to a second speed higher than the first speed. The control unit 101 executes one of the absorption operation and the delivery operation corresponding to the first section. The second section refers to a section in which the scanning speed is decelerated from the second speed to the first speed. The control unit 101 executes the other of the absorption operation and the delivery operation, which is different from the operation executed in the first section, corresponding to the second section. That is, when the absorption operation is executed corresponding to the first section, the control unit 101 executes the delivery operation corresponding to the second section, and when the delivery operation is executed corresponding to the first section, the control unit 101 executes the absorption operation corresponding to the second section.

For example, in the example of FIG. 7, when the first acceleration section As1 is set as the first section, the second deceleration section Ds2 corresponds to the second section. In this case, the scanning speed of zero corresponds to the first speed, and the first scanning speed v1 corresponds to the second speed. The control unit 101 controls the movement of the plunger 77 such that the movement amount of the plunger 77 in the +X direction in the delivery operation executed in the first acceleration section As1, which is the first section, matches the movement amount of the plunger 77 in the −X direction in the absorption operation executed in the second deceleration section Ds2, which is the second section. As a result, the position of the plunger 77 at the start of the first acceleration section As1 matches the position of the plunger 77 at the end of the second deceleration section Ds2. In addition, for example, when the second acceleration section As2 is set as the first section, the first deceleration section Ds1 corresponds to the second section. In this case, the second scanning speed v2 corresponds to the first speed, and the first scanning speed v1 corresponds to the second speed. Then, the movement of the plunger 77 is controlled such that the movement amount of the plunger 77 in the +X direction in the delivery operation executed in the second acceleration section As2, which is the first section, matches the movement amount of the plunger 77 in the −X direction in the first deceleration section Ds1, which is the second section. As a result, the position of the plunger 77 at the start of the first deceleration section Ds1 matches the position of the plunger 77 at the end of the second acceleration section As2. In this manner, it can also be said that the control unit 101 changes the scanning speeds in the first section and the second section in reverse to each other, and moves the plunger 77 corresponding to the first section and the second section in reverse directions by the same movement amount. In the same manner as described above, when the third acceleration section As3 is set as the first section, the third deceleration section Ds3 corresponds to the second section.

In the embodiment, the "movement of the plunger 77 corresponding to a certain section" corresponds to movement of the plunger 77 in the section. In another embodiment, the "movement of the plunger 77 corresponding to a certain section" may include movement of the plunger 77 outside the section. For example, the movement of the plunger 77 corresponding to the first section may be movement started before the first section and completed in the middle of the first section or after the first section, or may be movement started in the middle of the first section and completed after the first section.

In the embodiment, the control unit 101 controls the discharge amount adjusting unit 70 and the pressure adjusting unit 75 by determining the discharge control parameters such that a line width is substantially constant in each shaping section. The control unit 101 determines the opening degree of the flow path 69, an adjustment speed and adjustment timing of the opening degree by the discharge amount adjusting unit 70, and the movement amount, movement timing, and movement speed of the plunger 77 as the discharge control parameters. For example, the control unit 101 can increase the discharge amount and the line width by increasing the opening degree of the flow path 69 using the discharge amount adjusting unit 70. In addition, in the acceleration section, the control unit 101 can increase the discharge amount and the line width by advancing a timing at which the opening degree of the flow path 69 starts to be increased and increasing the adjustment speed, that is, by increasing a change amount in the opening degree per unit time. In the deceleration section, the control unit 101 can increase the discharge amount and the line width by delaying a timing at which the opening degree of the flow path 69 starts to be decreased and decreasing the adjustment speed, that is, by decreasing the change amount in the opening degree per unit time. In addition, the control unit 101 can adjust the discharge amount and the line width by controlling the movement amount of the plunger 77, the movement timing of the plunger 77, and the movement speed of the plunger 77 in the delivery operation and the absorption operation. An adjustment amount of the opening degree of the flow path 69, the adjustment speed and adjustment timing by the discharge amount adjusting unit 70, and the movement amount, movement timing and movement speed of the plunger 77 in the acceleration section or the deceleration section may be determined according to a type of shaping material, the line width, the set temperature of the heater 58, a rotation speed of the screw 40, or the like.

In the embodiment, when determining the discharge control parameters in step S130 described above, the control unit 101 sets the second section and then sets the first section corresponding to the second section. For example, when determining the discharge control parameters in the first shaping section Ms1, the control unit 101 first sets the second deceleration section Ds2 shown in FIGS. 6 and 7. When setting the second deceleration section Ds2, the control unit 101 determines the adjustment timing of the opening degree by the discharge amount adjusting unit 70 and the like in the second deceleration section Ds2, and the movement amount of the plunger 77 in the absorption operation executed in the second deceleration section Ds2, such that a line width is constant in the second deceleration section Ds2 and the tailing at the end Ed1 of the first shaping section Ms1 is prevented. Next, the control unit 101 sets the first acceleration section As1. When setting the first acceleration section As1, the control unit 101 determines the movement amount of the plunger 77 in the delivery operation executed in the first acceleration section As1 so as to match the movement amount of the plunger 77 in the second deceleration section Ds2. In addition, the control unit 101 determines the adjustment timing, the adjustment speed, and the like of the opening degree by the discharge amount adjusting unit 70 according to the determined movement amount of the plunger 77, such that the line width is constant in the first acceleration section As1. For example, in the example of the middle part of FIG. 7, the adjustment speed of the opening degree is adjusted to be lower than an ideal adjustment speed of the opening degree when the delivery operation is not temporarily executed in the acceleration section. A broken line in the middle part of FIG. 7 indicates an ideal change in the opening degree when the delivery operation is not executed. In the same manner as described above, the control unit 101 sets the second acceleration section As2 after the first deceleration section Ds1 is set, and sets the third acceleration section As3 after the third deceleration section Ds3 is set. In another embodiment, when determining the discharge control parameters, the control unit 101 may sets the first section and then sets the second section corresponding to the first section.

According to the three-dimensional shaping device 100 of the embodiment configured as described above, the control unit 101 executes the absorption operation and the delivery operation by moving the plunger 77 when shaping the partial shaped object, and controls the movement of the plunger 77 such that the positions of the plunger 77 at the start and the end of the shaping section for shaping the partial shaped object match with each other. On the other hand, when the plunger 77 is not controlled such that the positions of the plunger 77 at the start and the end of a certain shaping section match with each other, even if a desired plunger operation can be executed in the shaping section, there is a possibility that the desired plunger operation cannot be executed immediately in the next and subsequent shaping sections. For example, as the plunger 77 at the end of the certain shaping section is positioned farther from the flow path 69 than the position of the plunger 77 at the start of the certain shaping section, there is a higher possibility that the absorption operation cannot be immediately executed due to shortage of space for moving the plunger 77 at a start of the next shaping section or the like. When the space for executing the absorption operation is insufficient, in order to execute the absorption operation, for example, it is necessary to temporarily stop the shaping, position the nozzle 61 in a region different from the shaping region, execute the delivery operation, and secure the space for moving the plunger 77. In the embodiment, the movement of the plunger 77 is controlled such that the positions of the plunger 77 at the start and the end of the shaping section match with each other, and thus the shortage of space for moving the plunger 77 in each shaping section can be prevented without stopping the shaping, and it is possible to increase the possibility of executing the desired plunger operation.

In the embodiment, the control unit 101 causes the positions of the plunger 77 at the start and the end of the shaping section for shaping the partial shaped object by controlling the sum of displacements of the plunger 77 which occur due to the movement of the plunger 77 corresponding to the acceleration sections and the sum of displacements of the plunger 77 which occur due to the movement of the plunger 77 corresponding to the deceleration sections. Therefore, the positions of the plunger 77 at the start and the end of the shaping section can be matched by a simple method.

Further, in the embodiment, the control unit 101 executes one of the absorption operation and the delivery operation corresponding to the first section in which the scanning speed is accelerated from the first speed to the second speed, executes the other of the absorption operation and the delivery operation corresponding to the second section in which the scanning speed is decelerated from the second speed to the first speed, and controls the movement of the plunger 77 such that the movement amount of the plunger 77 corresponding to the first section and the movement amount of the plunger 77 corresponding to the second section match with each other. Accordingly, by controlling the movement of the plunger 77 such that the movement amounts of the plunger 77 corresponding to the sections in which absolute amounts of the changes in the scanning speed are the same are matched, it is possible to more easily control the movement of the plunger 77 such that the sum of the displacements which occur due to the movement of the plunger 77 corresponding to the acceleration sections and the sum of the displacements which occur due to the movement of the plunger 77 corresponding to the deceleration sections offset each other. Therefore, the positions of the plunger 77 at the start and the end of the shaping section can be more easily matched.

In addition, the control unit 101 controls the discharge amount adjusting unit 70 to make the opening area of the flow path 69 in the second operation smaller than the opening area in the first operation. Accordingly, for example, as compared with a case where the opening areas are the same in the first operation and the second operation or a case where the opening area in the second operation is larger than the opening area in the first operation, it is possible to prevent the discharge amount from becoming excessive due to an increase in the pressure in the flow path 69 caused by the delivery operation executed in the second operation.

In the embodiment, the control unit 101 executes the second operation before the first operation. Therefore, for example, by executing the first operation while the nozzle 61 moves at a constant speed and executing the second operation when decelerating or accelerating the nozzle 61 prior to the first operation, it is possible to accurately control the discharge amount when decelerating or accelerating the nozzle 61. In another embodiment, the control unit 101 may execute the third operation before the first operation, or may execute the second operation and the third operation before the first operation. In this case, in the same manner as described above, it is possible to accurately control the discharge amount when decelerating or accelerating the nozzle 61.

B. Second Embodiment

Figure 8:
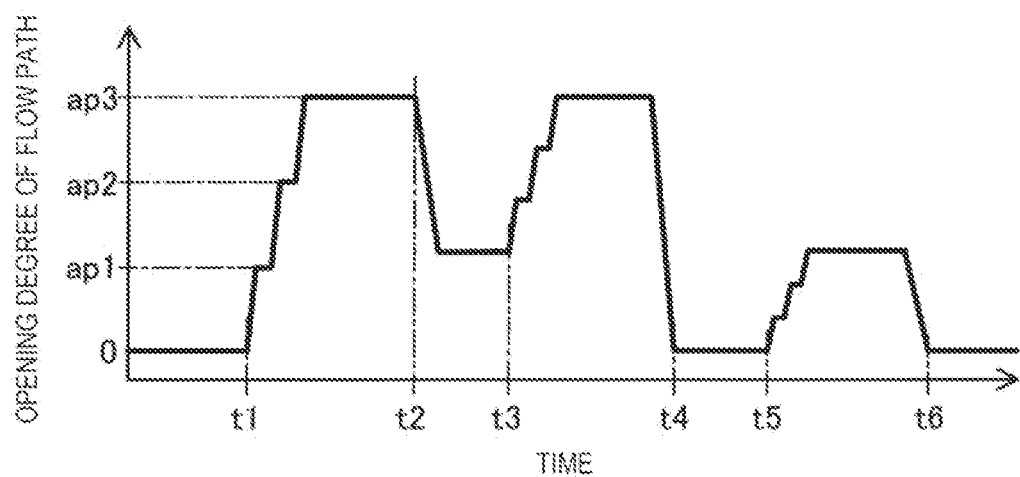
FIG. 8 is a schematic diagram showing a change in an opening degree of a flow path according to a second embodiment.

FIG. 8 is a schematic diagram showing a change in an opening degree of the flow path 69 according to a second embodiment. As in the middle part of FIG. 7, FIG. 8 shows a change in the opening degree of the flow path 69 when the partial shaped object shown in FIG. 6 is shaped. In the embodiment, unlike the first embodiment, when increasing the discharge amount, the control unit 101 executes an operation of increasing the opening area of the flow path 69 in a stepwise manner by controlling the discharge amount adjusting unit 70. Parts in the configuration of the three-dimensional shaping device 100 that are not specifically described are similar to those of the first embodiment.

In the embodiment, when increasing the discharge amount corresponding to the acceleration section, the control unit 101 increases the opening area of the flow path 69 in three stages by controlling the discharge amount adjusting unit 70. For example, as shown in FIG. 8, in the first acceleration section As1, the control unit 101 first increases the opening degree of the flow path 69 from zero to an opening degree ap1, then increases the opening degree of the flow path 69 from the opening degree ap1 to an opening degree ap2, and further increases the opening degree of the flow path 69 from the opening degree ap2 to an opening degree ap3.

According to the second embodiment described above, when increasing the discharge amount, the control unit 101 executes the operation of increasing the opening area of the flow path 69 in the stepwise manner by controlling the discharge amount adjusting unit 70. On the other hand, for example, when the opening area of the flow path 69 is increased to a target opening area at once, the shaping material may flow out at once from an upstream portion to a downstream portion due to a pressure difference between the upstream portion and the downstream portion of the discharge amount adjusting unit 70 in the flow path 69. In particular, when the shaping material is generated in a state where the opening degree of the flow path 69 is zero, a pressure in the upstream portion from the discharge amount adjusting unit 70 in the flow path 69 increases, and thus when the opening degree of the flow path 69 is increased at once in this state, the shaping material easily flows out at once from the upstream portion of the discharge amount adjusting unit 70 to the downstream portion. In the embodiment, when increasing the discharge amount, by executing the operation of increasing the opening area of the flow path 69 in a stepwise manner, it is possible to prevent the shaping material from flowing out from the upstream portion to the downstream portion of the discharge amount adjusting unit 70 in the flow path 69 at once. Therefore, the discharge amount can be more accurately controlled. In addition, for example, when the absorption operation or the delivery operation is executed while increasing the discharge amount in the acceleration section or the like, by changing the position of the plunger 77 in a stepwise manner according to the opening area of the flow path 69 which increases in a stepwise manner, a possibility that the discharge amount can be controlled more precisely increases.

In another embodiment, when increasing the discharge amount, the control unit 101 may increase the opening area of the flow path 69 in two stages or four or more stages, for example. In all cases where the discharge amount is increased, the opening area may not be increased in the stepwise manner. In addition, in the case of increasing the discharge amount, the control unit 101 may determine whether to increase the opening area in a stepwise manner or the number of stages in the case of increasing the opening area in a stepwise manner based on, for example, a current opening degree or a current opening area, a difference between the current opening degree and the target opening degree or between the current opening area and the target opening area, or a timing of executing the control of increasing the opening area.

C. Other Embodiments (C-1) In the above-described embodiments, the discharge amount adjusting unit 70 may be implemented by a mechanism using a piston in which the piston protrudes into the flow path 69 to change the opening area of the flow path 69 or a mechanism using a shutter that moves in a direction intersecting the flow path 69 to change the opening area of the flow path 69. The discharge amount adjusting unit 70 may be implemented by combining two or more of a butterfly valve of the above-described embodiment, the above-described shutter mechanism, and the above-described plunger mechanism.

(C-2) In the above-described embodiments, the control unit 101 controls the movement of the plunger 77 such that the movement amount of the plunger 77 corresponding to the first section matches the movement amount of the plunger 77 corresponding to the second section. Alternatively, the control unit 101 may not control the movement of the plunger 77 in this manner. For example, the control unit 101 may simply control the movement of the plunger 77 such that the sum of displacements of the plunger 77 which occur due to the movement of the plunger 77 corresponding to the acceleration sections and the sum of displacements of the plunger 77 which occur due to the movement of the plunger 77 corresponding to the deceleration sections offset each other instead of matching the movement amount of the plunger 77 corresponding to the first section and the movement amount of the plunger 77 corresponding to the second section.

(C-3) In the above-described embodiments, the control unit 101 causes the positions of the plunger 77 at the start and the end of the shaping section to match with each other by controlling the sum of displacements of the plunger 77 which occur due to the movement of the plunger 77 in the acceleration sections and the sum of displacements of the plunger 77 which occur due to the movement of the plunger 77 in the deceleration sections, but the movement of the plunger 77 may not be controlled in this manner. For example, the control unit 101 may control the movement of the plunger 77 such that the position of the plunger 77 matches with the start and the end of the shaping section by executing the absorption operation or the delivery operation so as to change the position of the plunger 77 little by little to the extent that it does not affect molding accuracy in a range in which acceleration or deceleration of the nozzle 61 is not executed after executing the absorption operation or the delivery operation in the acceleration section or the deceleration section. In this case, for example, the control unit 101 may adjust the opening degree of the flow path 69 by the discharge amount adjusting unit 70 such that a line width is constant in a section in which the plunger 77 is gradually moved.

(C-4) In the above-described embodiments, the control unit 101 executes at least one of the first operation, the second operation, and the third operation in the specified section. Alternatively, the control unit 101 may discharge the shaping material from the nozzle opening 62 while executing the absorption operation by executing, for example, the fourth operation in a certain specified section.

(C-5) In the above-described embodiments, the control unit 101 makes the opening area in the second operation smaller than the opening area in the first operation. Alternatively, the control unit 101 may not control the opening area as described above, and for example, the opening areas may be the same in the first operation and the second operation, and the rotation speed of the screw 40 in the second operation may be smaller than the rotation speed of the screw 40 in the first operation.

(C-6) In the above-described embodiments, the screw 40 is a flat screw. Alternatively, the screw 40 may not be a flat screw, and may be an in-line screw.

(C-7) In the above-described embodiment, a pellet-shaped ABS resin is used as a raw material to be supplied to the material supply unit 20. On the other hand, the three-dimensional shaping device 100 can shape the three-dimensional shaped object by using various materials such as a thermoplastic material, a metal material, and a ceramic material as a main material. The "main material" refers to a material serving as a center component for forming a shape of a three-dimensional shaped object, and refers to a material having a content of 50 wt % or more in the three-dimensional shaped object. The above-described shaping material includes a material obtained by melting the main material alone or a material which is formed into a paste form by melting a part of components contained along with the main material.

When the thermoplastic material is used as the main material, the shaping material is generated by plasticizing the material in the plasticizing unit 30.

As the thermoplastic material, for example, the following thermoplastic resin materials can be used.
Examples of Thermoplastic Resin Material General-purpose engineering plastic such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, and polyetherimide Additives such as a wax, a flame retardant, an antioxidant, and a heat stabilizer may be mixed into the thermoplastic material in addition to a pigment, a metal, and a ceramic. In the plasticizing unit 30, the thermoplastic material is converted into a melted state by being plasticized by the rotation of the screw 40 and the heating of the heater 58. After the shaping material generated by melting the thermoplastic material is discharged from the nozzle 61, the shaping material is cured due to a reduction in temperature.

It is desirable that the thermoplastic material is discharged from the nozzle 61 in a state in which the material is heated to a temperature equal to or higher than the glass transition point thereof and is completely melted. For example, a glass transition point of the ABS resin is about 120° C., and it is desirable that the ABS resin is ejected from the nozzle 61 at about 200° C.

In the three-dimensional shaping device 100, for example, the following metal material may be used as the main material instead of the above-described thermoplastic material. In this case, it is desirable that a component to be melted at the time of generating the shaping material is mixed with a powder material obtained by converting the following metal material into a powder, and the mixture is put into the plasticizing unit 30 as a raw material.
Examples of Metal Material Single metals such as magnesium (Mg), iron (Fe), cobalt (Co), chromium (Cr), aluminum (Al), titanium (Ti), copper (Cu), and nickel (Ni), or an alloy containing one or more of these metals
Examples of Alloy Maraging steel, stainless steel, cobalt chromium molybdenum, titanium alloy, nickel alloy, aluminum alloy, cobalt alloy, and cobalt chromium alloy In the three-dimensional shaping device 100, a ceramic material may be used as the main material instead of the above-described metal material. Examples of the ceramic material may include an oxide ceramic such as silicon dioxide, titanium dioxide, aluminum oxide, and zirconium oxide, and a non-oxide ceramic such as aluminum nitride. When the above-described metal material or ceramic material is used as the main material, the shaping material disposed on the stage 210 may be cured by, for example, sintering with laser irradiation or warm air.

A powder material of the metal material or the ceramic material to be put into the material supply unit 20 as the raw material may be a mixed material in which a plurality of types of powders of single metals or alloys are mixed or a mixed material in which a plurality of types of powders of ceramic materials are mixed. The powder material of the metal material or the ceramic material may be coated with, for example, a thermoplastic resin listed in the above-described examples, or a thermoplastic resin other than those listed in the above-described examples. In this case, the thermoplastic resin may be melted to exhibit fluidity in the plasticizing unit 30.

For example, the following solvents may be added to the powder material of the metal material or the ceramic material to be put into the material supply unit 20 as the raw material. One solvent or a combination of two or more solvents selected from the following solvents may be used.

Examples of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, isopropyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (such as tetrabutylammonium acetate); and ionic liquids such as butyl carbitol acetate In addition, for example, the following binders may be added to the powder material of the metal material or the ceramic material to be put into the material supply unit 20 as the raw material.

Examples of Binder

An acrylic resin, an epoxy resin, a silicone resin, a cellulose-based resin or other synthetic resins, and a polylactic acid (PLA), polyamide (PA), polyphenylene sulfide (PPS), polyether ether ketone (PEEK) or other thermoplastic resins D. Other Aspects The present disclosure is not limited to the above-described embodiments, and can be implemented in various aspects without departing from the spirit of the present disclosure. For example, the present disclosure can be implemented in the following aspects. In order to solve a part of or all of problems of the present disclosure, or in order to achieve a part of or all of effects of the present disclosure, technical features of the above embodiments corresponding to technical features in the following aspects can be replaced or combined as appropriate. The technical features can be appropriately deleted unless described as essential in the present specification.

(1) According to a first aspect of the present disclosure, a three-dimensional shaping device is provided. The three-dimensional shaping device includes: a nozzle having a nozzle opening and configured to discharge a shaping material from the nozzle opening toward a stage; a position changing unit configured to change a relative position between the nozzle and the stage; a discharge amount adjusting unit provided in a flow path which is in communication with the nozzle opening and through which the shaping material flows, and configured to adjust a discharge amount of the shaping material from the nozzle opening by changing an opening area of the flow path; a pressure adjusting unit including a branch flow path coupled to the flow path between the discharge amount adjusting unit and the nozzle opening, and a plunger configured to move in the branch flow path; and a control unit configured to control the position changing unit, the discharge amount adjusting unit, and the pressure adjusting unit. The control unit is configured to execute an absorption operation of absorbing the shaping material in the flow path into the branch flow path and a delivery operation of delivering the shaping material absorbed into the branch flow path to the flow path, by moving the plunger when shaping one partial shaped object having a continuous linear shape, and control movement of the plunger such that positions of the plunger in the branch flow path at a start and an end of a shaping section for shaping the partial shaped object match with each other.

According to such an aspect, the movement of the plunger is controlled such that the positions of the plunger at the start and the end of the shaping section match with each other, and thus it is possible to prevent the shortage of space for moving the plunger in each shaping section without stopping the shaping, and it is possible to increase the possibility of executing the desired plunger operation.

(2) In the above aspect, the shaping section may include one or more acceleration sections in which a relative movement speed of the nozzle with respect to the stage is accelerated and one or more deceleration sections in which the relative movement speed is decelerated, and the control unit may cause the positions of the plunger in the branch flow path at the start and the end of the shaping section to match with each other by controlling a sum of displacements of the plunger which occur due to the movement of the plunger corresponding to the acceleration sections and a sum of displacements of the plunger which occur due to the movement of the plunger corresponding to the deceleration sections. According to such an aspect, the positions of the plunger at the start and the end of the shaping section can be matched by a simple method.

(3) In the above aspect, the control unit may execute any one of the absorption operation and the delivery operation corresponding to a first section in which the relative movement speed is accelerated from a first speed to a second speed, execute, when the absorption operation is executed corresponding to the first section, the delivery operation corresponding to a second section in which the relative movement speed is decelerated from the second speed to the first speed, and execute, when the delivery operation is executed corresponding to the first section, the absorption operation, and control the movement of the plunger such that a movement amount of the plunger corresponding to the first section and a movement amount of the plunger corresponding to the second section match with each other. According to such an aspect, by controlling the movement of the plunger such that the movement amounts of the plunger corresponding to the sections in which absolute amounts of changes in the movement speed of the nozzle are the same are matched, the positions of the plunger at the start and the end of the shaping section can be more easily matched.

(4) In the above aspect, in a specified section in the shaping section in which relative movement of the nozzle with respect to the stage at a constant movement speed is instructed, the control unit may execute at least one of a first operation of discharging the shaping material from the nozzle opening, without controlling the pressure adjusting unit, in a state where the flow path is opened by the discharge amount adjusting unit, a second operation of discharging the shaping material from the nozzle opening by controlling the pressure adjusting unit to execute the delivery operation in a state where the flow path is opened by the discharge amount adjusting unit, and a third operation of discharging the shaping material from the nozzle opening by controlling the pressure adjusting unit to execute the delivery operation in a state where the flow path is closed by the discharge amount adjusting unit.

(5) In the above aspect, the control unit may control the discharge amount adjusting unit to make the opening area in the second operation smaller than the opening area in the first operation. According to such an aspect, for example, as compared with a case where the opening areas are the same in the first operation and the second operation or a case where the opening area in the second operation is larger than the opening area in the first operation, it is possible to prevent the discharge amount from becoming excessive due to an increase in the pressure in the flow path caused by the delivery operation executed in the second operation.

(6) In the above aspect, the control unit may execute at least one of the second operation and the third operation before the first operation. According to such an aspect, for example, by executing the first operation while the nozzle moves at a constant speed and executing the second operation or the third operation when decelerating or accelerating the nozzle prior to the first operation, it is possible to accurately control the discharge amount when decelerating or accelerating the nozzle.

(7) In the above aspect, when increasing the discharge amount, the control unit may execute an operation of increasing the opening area in a stepwise manner by controlling the discharge amount adjusting unit. According to such an aspect, for example, when the opening area of the flow path is increased to a target opening area at once, it is possible to prevent the shaping material from flowing out at once from an upstream portion to a downstream portion of the discharge amount adjusting unit in the flow path.

(8) According to a second aspect of the present disclosure, a three-dimensional shaped object manufacturing method to be executed in a three-dimensional shaping device is provided, the three-dimensional shaping device includes a nozzle having a nozzle opening and configured to discharge a shaping material from the nozzle opening toward a stage; a position changing unit configured to change a relative position between the nozzle and the stage; a discharge amount adjusting unit provided in a flow path which is in communication with the nozzle opening and through which the shaping material flows, and configured to adjust a discharge amount of the shaping material from the nozzle opening by changing an opening area of the flow path; a pressure adjusting unit including a branch flow path coupled to the flow path between the discharge amount adjusting unit and the nozzle opening, and a plunger configured to move in the branch flow path. The manufacturing method includes: a step of absorbing the shaping material in the flow path into the branch flow path and a step of delivering the shaping material absorbed into the branch flow path to the flow path, by moving the plunger when shaping one partial shaped object having a continuous linear shape, and the plunger is moved such that positions of the plunger in the branch flow path at a start and an end of a shaping section for shaping the partial shaped object match with each other.

What is claimed is:

1. A three-dimensional shaping device, comprising:
a nozzle having a nozzle opening and configured to discharge a shaping material from the nozzle opening toward a stage;
a first motor configured to change a relative position between the nozzle and the stage;
a discharge amount adjusting valve provided in a flow path which is in communication with the nozzle opening and through which the shaping material flows, and configured to adjust a discharge amount of the shaping material from the nozzle opening by changing an opening area of the flow path;
a pressure adjusting assembly including a branch flow path coupled to the flow path between the discharge amount adjusting valve and the nozzle opening, a plunger, and a second motor configured to move the plunger in the branch flow path, the plunger being movable in a movable range in the branch flow path;
a memory configured to store a program; and
a processor configured to execute the program so as to:
execute an absorption operation of absorbing the shaping material in the flow path into the branch flow path and a delivery operation of delivering the shaping material absorbed into the branch flow path to the flow path, by moving the plunger when shaping one partial shaped object having a continuous linear shape along a shaping section for shaping the one partial shaped object and by controlling the first motor, the discharge amount adjusting valve, and the second motor;
move the plunger to a reference position by controlling the second motor, the reference position being an intermediate position in the movable range of the plunger;
cause the nozzle to start shaping of the one partial shaped object having the continuous linear shape after the processor sets the plunger at the reference position; and
cause the nozzle to end the shaping of the one partial shaped object having the continuous linear shape such that the plunger stops at the reference position in the branch flow path.

2. The three-dimensional shaping device according to claim 1, wherein
the shaping section includes an acceleration section in which a relative movement speed of the nozzle with respect to the stage is accelerated and a deceleration section in which the relative movement speed is decelerated, and
the processor is further configured to control a displacement of the plunger which occur due to the movement of the plunger corresponding to the acceleration section and a displacement of the plunger which occur due to the movement of the plunger corresponding to the deceleration section such that:
the processor causes the nozzle to start shaping of the one partial shaped object having the continuous linear shape after the processor set the plunger at the reference position; and
the plunger stops at the reference position in the branch flow path when the processor causes the nozzle to end the shaping of the one partial shaped object having the continuous linear shape.

3. The three-dimensional shaping device according to claim 2, wherein
the processor is further configured to:
cause the second motor to move the plunger to execute one of the absorption operation and the delivery operation during a first period of time in which the relative movement speed is accelerated from a first speed to a second speed;
cause the second motor to move the plunger to execute the other of the absorption operation and the delivery operation during a second period of time in which the relative movement speed is decelerated from the second speed to the first speed; and
control the second motor such that a movement amount of the plunger during the first period of time matches with a movement amount of the plunger during the second period of time.

4. The three-dimensional shaping device according to claim 1, wherein
in a specified section in the shaping section in which relative movement of the nozzle with respect to the stage at a constant movement speed is instructed by the processor, the processor is further configured to execute at least one of:
a first operation of discharging the shaping material from the nozzle opening, without controlling the pressure adjusting assembly, in a state where the flow path is opened by the discharge amount adjusting valve;
a second operation of discharging the shaping material from the nozzle opening by controlling the pressure adjusting assembly to execute the delivery operation in a state where the flow path is opened by the discharge amount adjusting valve; and
a third operation of discharging the shaping material from the nozzle opening by controlling the pressure adjusting assembly to execute the delivery operation in a state where the flow path is closed by the discharge amount adjusting valve.

5. The three-dimensional shaping device according to claim 4, wherein
the processor is further configured to control the discharge amount adjusting valve to make an opening area in the second operation smaller than an opening area in the first operation.

6. The three-dimensional shaping device according to claim 4, wherein
the processor is further configured to execute at least one of the second operation and the third operation before the first operation.

7. The three-dimensional shaping device according to claim 1, wherein
when increasing the discharge amount, the processor is further configured to execute an operation of increasing an opening area in a stepwise manner by controlling the discharge amount adjusting valve.

* * * * *